United States Patent
Perona et al.

[11] Patent Number: 6,044,165
[45] Date of Patent: *Mar. 28, 2000

[54] APPARATUS AND METHOD FOR TRACKING HANDWRITING FROM VISUAL INPUT

[75] Inventors: Pietro Perona, Altadena; Mario Munich, Pasadena; Steffano Soatto, Altadena, all of Calif.

[73] Assignee: California Institute of Technology, Pasadena, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/490,678

[22] Filed: Jun. 15, 1995

[51] Int. Cl.[7] .................................................. G06K 9/00
[52] U.S. Cl. ...................... 382/103; 382/186; 382/313; 345/179
[58] Field of Search ................................. 382/313, 314, 382/315, 186, 187, 188, 189, 100, 103, 119; 345/179, 156

[56] References Cited

U.S. PATENT DOCUMENTS

| | | | |
|---|---|---|---|
| 4,315,282 | 2/1982 | Schumacher | 358/107 |
| 5,157,737 | 10/1992 | Sklarew | 382/13 |
| 5,181,255 | 1/1993 | Bloomberg | 382/9 |
| 5,226,091 | 7/1993 | Howell et al. | 382/3 |
| 5,297,216 | 3/1994 | Sklarew | 382/13 |
| 5,317,140 | 5/1994 | Dunthurn | 250/221 |
| 5,323,470 | 6/1994 | Kara | 382/100 |
| 5,325,447 | 6/1994 | Vogt, III | 382/46 |
| 5,333,209 | 7/1994 | Sinden et al. | 382/13 |
| 5,337,370 | 8/1994 | Gilles et al. | 382/14 |
| 5,347,295 | 9/1994 | Agulnick et al. | 345/156 |
| 5,347,477 | 9/1994 | Lee | 364/701.11 |
| 5,365,598 | 11/1994 | Sklarew | 382/13 |
| 5,436,639 | 7/1995 | Arai | 345/156 |
| 5,552,823 | 9/1996 | Kageyama | 348/155 |
| 5,581,276 | 12/1996 | Cipolla et al. | 345/156 |

*Primary Examiner*—Matthew C. Bella
*Attorney, Agent, or Firm*—Fish & Richardson P.C.

[57] ABSTRACT

A system for detecting movement of a writing implement relative to a writing surface to determine the path of the writing implement. The writing implement tip is determined within the image and used to form a kernel. The determination is made either manually, by looking for a predetermined pen tip shape, or by looking for a position of maximum motion in the image. That kernel is tracked from frame to frame to define the path of the writing implement. The tracking is accomplished by correlating the kernel to the image: either to the whole image, to a portion of the image near the last position of the kernel, or to a portion of the image predicted by a prediction filter.

42 Claims, 4 Drawing Sheets

APPARATUS AND METHOD FOR TRACKING HANDWRITING FROM VISUAL INPUT

STATEMENT OF GOVERNMENT RIGHTS

The U.S. government may have certain rights in this invention pursuant to grant number N00014-93-990 awarded by the Navy.

FIELD OF THE INVENTION

The present invention defines a technique of tracking and processing handwriting characteristics. More specifically, the present technique uses a camera to monitor and track the position of a moving writing implement tip in order to define characteristics of handwriting it defines.

BACKGROUND OF THE INVENTION AND SUMMARY OF THE INVENTION

Computer processing of human handwriting is an important and fast growing field of application. A number of computers use handwriting as their input. One example is the Apple-Newton (™) which senses writing on its screen. The user places his pen against the screen surface, and the surface records movement of the pen tip thereon. The movement of the pen tip is converted into a signal indicative of the handwriting that has occurred. This handwriting signal is processed in various ways to obtain recognition information about the handwriting signal.

Handwriting can be recognized using many different techniques which are described for example in U.S. Pat. Nos. 5,365,598, 5,347,295, 5,333,209, and 5,181,255, the disclosures of which are herein incorporated by reference. Of course, other techniques are also known for recognizing handwriting, including neural net techniques.

Apart from recognizing handwritten text, the movement of the writing implement can also be used to perform other tasks. One is signature verification. Signature verification compares a person's signature against a stored signature in a database. The signature is "verified" if it matches the signature in the database according to predetermined criteria. These criteria can include, for example, the look of the signature, the speed and style with which the pen is moved, and the like.

Yet another application is the input of drawings and the editing of existing drawings and images for desktop publishing and other activities requiring graphical input.

All of these techniques have required a tablet or a sensitive screen for writing. The tablet senses the movement of the pen by sensing where it touches the tablet surface. The speed of the pen and other parameters can also be sensed. This requires, however, that the tablet be large enough to allow writing on its surface. The tablet must also have certain characteristics which allow it to follow the pen, such as pressure sensitivity or capacitance sensitivity. Some tablets allow paper to be superimposed over the tablet. The ones that do not, however, provide an unnatural feel to the writing since most users are accustomed to obtaining feedback during their writing—they see and feel the writing as it occurs on the paper. In addition, the position of the writing on the screen causes a parallax error, since users are not accustomed to seeing the writing occurring so far from the pen tip. These parameters contribute to a lack of proper feedback which can distort the user's writing enough to make handwriting recognition or verification more difficult.

Another problem, moreover, is that the pens intended to write on the tablet often do not have a writing tip, and therefore their resistance against the tablet surface is different than that to which the user is accustomed. Also, many such systems require a special pen which uses capacitive coupling and this further changes the feel of the pen and the writing.

Also, even in those systems which allow use of normal pens, and/or a sheet of paper superimposed over the screen, the inventors realized a problem that the size of the unit cannot be reduced below a certain limit. This conflicts with the important goal of miniaturization. Computers, and especially notebook computers, are becoming smaller and smaller. Screens are currently available or coming into production which are comparable in size to eyeglass lenses, e.g., one inch square. These screens are viewed through a magnifying glass. The information input device then becomes one factor limiting the size of the computer. The inventors realized that a keyboard cannot be made much smaller than the usual keyboard size without affecting the user's typing. Pen based tablet techniques, moreover, are limited by the size of the special tablet. The user must have sufficient area to write to allow that writing to be recognized, and to prevent the user's writing from being distorted by the size of the tablet.

The special tablet is also often fragile because of its pressure sensitivity.

It is an object of the present invention to provide a graphical input system which does not require a special writing pad and hence has no limits or constraints from the size of the writing pad. A camera and associated processing circuitry is used for graphical input according to the present invention. This different approach allows flexibility. Even though some cameras are just as large as a tablet, others can be made very small.

A further deficiency with the tablet-based systems is that handwriting can only be sensed on the special surface.

Another object of the present invention is to allow monitoring of handwriting on any surface. This allows, for example, handwriting on a whiteboard or chalkboard to be monitored and stored or processed. A printer can be attached to the system to effectively allow forming a printing whiteboard without any special hardware being attached to the whiteboard.

These and other objects are effected according to the present invention by providing a camera which monitors movement of a writing implement relative to a writing surface and associated processing hardware which processes the output of the camera to track that movement.

Some systems which recognize already-written characters are known, including systems like the "digital desk-top", made by Rank/Xerox. These systems do not monitor the movement leading to the writing, but instead monitor the already written words.

This is described in further detail herein.

The present invention teaches a technique of recognizing writing using any writing implement, e.g., a pen, on any writing surface, e.g., a normal piece of paper. The position of the writing implement is preferably tracked by a camera and associated processing equipment. Such cameras are already susceptible of microminiaturization. The camera is placed in a location where it can view and form images of the movement of the pen on the paper. This movement is translated into signals, and these signals are further processed, e.g., recognized as handwriting or converted to an image file.

In one preferred embodiment the initial position of the pen tip is determined. Once the pen tip is determined, the image neighborhood around the initial position of the pen tip is assembled into a "kernel". This kernel is used to determine the position of the pen in subsequent frames. The kernel or image of the tip of the pen is used to scan over the entire image until obtaining a good match. The matching includes moving the kernel on the image, obtaining the product of the image pixel, and summing over all the products. The largest value is the best match.

BRIEF DESCRIPTION OF THE DRAWINGS

These and other aspects of the invention will now be described in detail with reference to the accompanying drawings, wherein.

DESCRIPTION OF THE PREFERRED EMBODIMENTS

Figure 1:
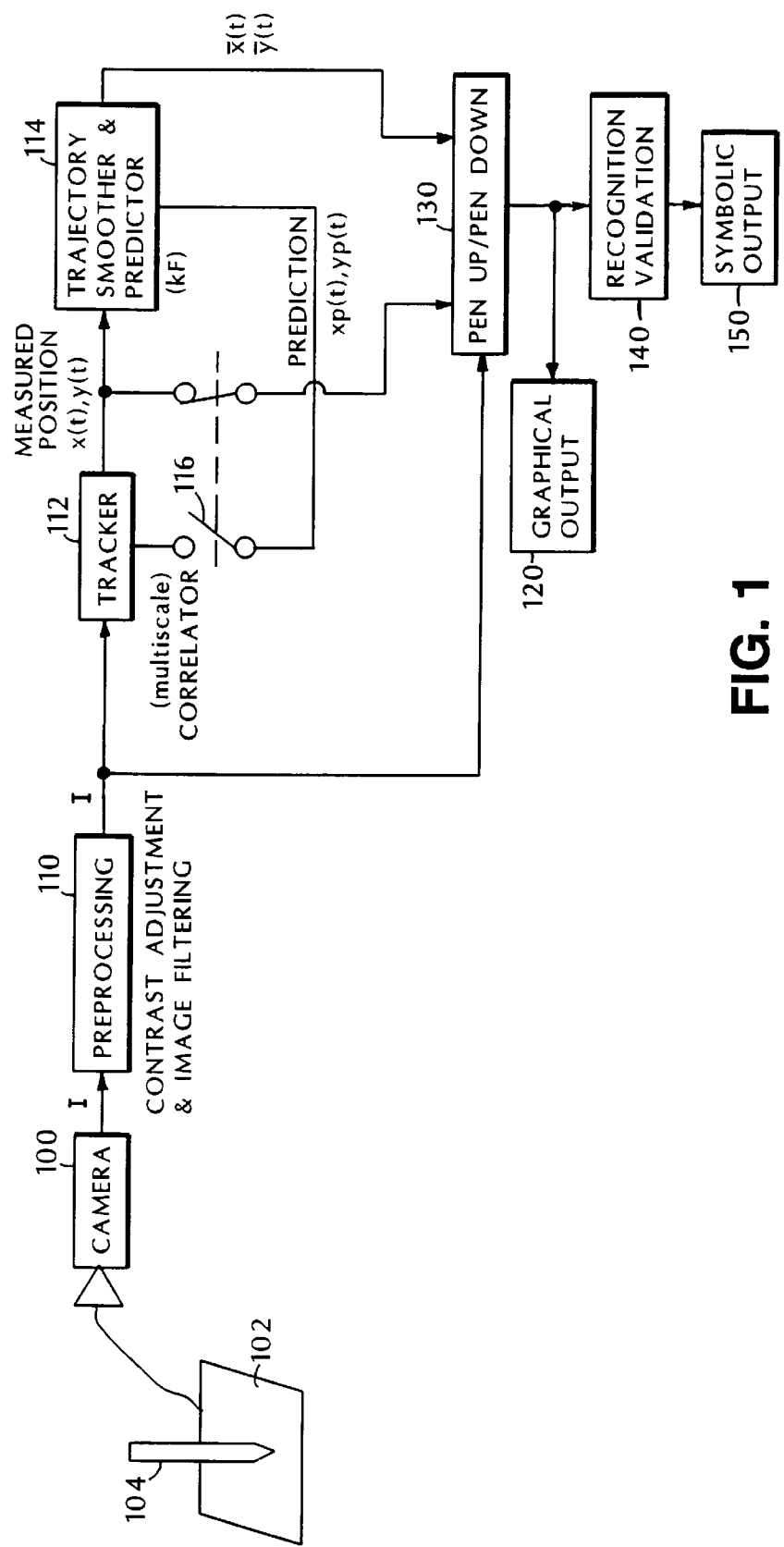
FIG. 1 shows a basic block diagram of the invention.

The presently preferred embodiment of the invention will be described in detail with respect to the accompanying drawings. The basic embodiment of the invention uses a camera 100, preferably a miniature camera, aimed at the writing surface, e.g., sheet of paper 102, on which a user is writing with a writing implement. The writing implement is preferably pen 104. The user's hand is not shown for clarity in FIG. 1.

More generally, any device which obtains a video image of the movement of the writing implement relative to the writing surface could be used to acquire the image used according to the present invention. The image which is referred to herein can be the image of a pen or other writing instrument, including the had and/or fingers while it is tracing letters, graphic characters, or any other image formed by user's hand movement. Importantly, this system preferably monitors relative movement of the writing implement, instead of imaging previously-written characters.

The output of the camera is pre-processed by pre-processor 110 to adjust contrast and other parameters, remove artifacts and filter the image. The pre-processed image is input to a processor embodied in this invention by tracker 112, which processes the information received from the pen 104. According to the present invention, this information is preferably processed for an application, e.g., handwriting recognition on a tablet, whiteboard recognition, signature verification, or any other form of converting the tracked output into an image file, by image processor 130. The tracked output is either a symbolic or a graphical representation. A pen up/pen down classifier 130 provides an indication of whether the pen is touching the writing surface or not, as described herein. A system recognition unit 140 which can also be part of the processor, uses the outputs to recognize the movement as described herein. Output unit 120, for example, a graphical screen, can display this path. Output unit 150, for example, a text display, displays results of the symbolic recognition information.

Tracker 112 executes an operation to track the information contained in the input images. Preferably, dedicated modules are used in order to speed up the processing. Conceptually, the processing of information effected by the tracker 112 includes initialization, measurement of pen tip position, and filtering. FIG. 1 also shows an optional dynamic prediction module 114 which is one way of operation according to the present invention.

Figure 2:
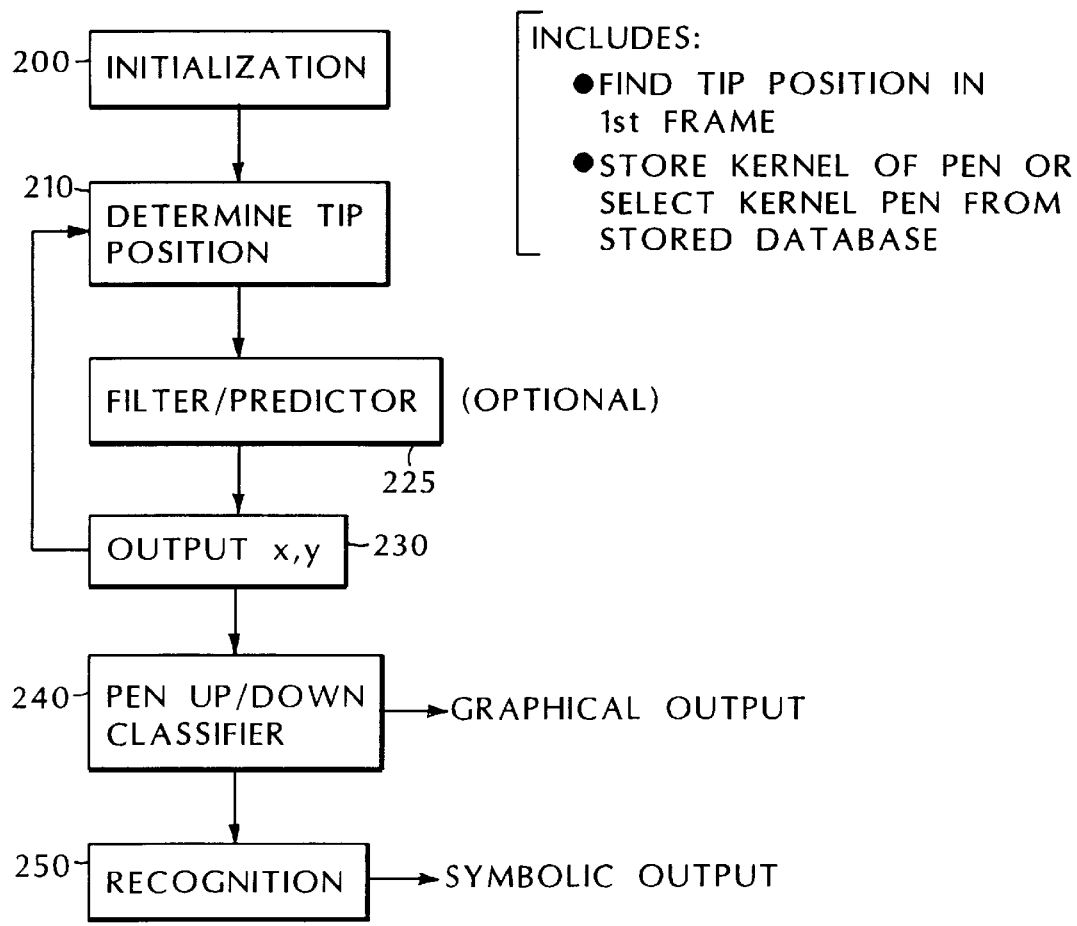
FIG. 2 is a summary flowchart of the present invention.

The overall operation of the system is shown in the flowchart of FIG. 2. Initialization in step 200 determines the position of the pen tip in the first frame. This can be obtained manually, for example, by moving a cursor to a point in the image. The initial position of the pen can also be obtained automatically as described herein.

As part of the initialization at step 200, a small image neighborhood around the initial position of the pen tip is stored. This image neighborhood may be used as a kernel for computing correlation with the subsequent frames. Various ways can be effected for correlating with subsequent frames.

Step 210 represents sampling the image at a predetermined sampling rate and correlating the kernel to the image to find the kernel in subsequent image frames. Step 225 shows the optional prediction and filtering step. This may under some circumstances speed the processing. Step 230 outputs the x and y coordinates of the operation to represent using the path traced by the successful correlations. Step 240 uses the x and y coordinates and other information about the image to classify the pen lifts, i.e. to decide when the pen is touching the writing surface.

Step 250 represents recognizing the content of handwriting.

Initialization

There are three preferred ways to carry out the initialization, any of which can be used according to the present invention.

The first and simplest way of initializing the tracker is by a manual technique. This uses a pointer device such as a mouse to click on the pen tip in the first frame. The mouse driver returns the x and y screen coordinates of the tip of the pen. The kernel is obtained from a part of the image near the x and y coordinates returned by the mouse driver—for example 8×8 or 16×16 pixel portions of the image close to the initialized position.

A second way of initialization requires writing with a pen that is familiar to the system. This preferred technique stores a database of known pen tip shapes. For example, ten specific kinds of pens are digitized in advance, and their tip shapes are stored in the memory. The initialization then correlates all of the known pen tip shapes over the entire image. An initialization is established when there is a correlation match within a predetermined amount to one of the pen tips in the database. The kernel of the recognized pen tip is stored in memory, so that future correlation operations are carried out with this kernel indicative of the known pen tip.

For example, the ten most commonly selling types of pens could be stored as templates against which automatic initialization is carried out.

If a known pen tip is not recognized, then the pen tip is processed as an unknown pen tip as described herein.

Another aspect of the invention stores the kernels of the unknown pen tips in the database once they are recognized, so that future operations will recognize that pen tip more easily.

According to another embodiment of this invention, there is only a single pen tip, and the system is trained to recognize only that single pen tip.

Figure 3:
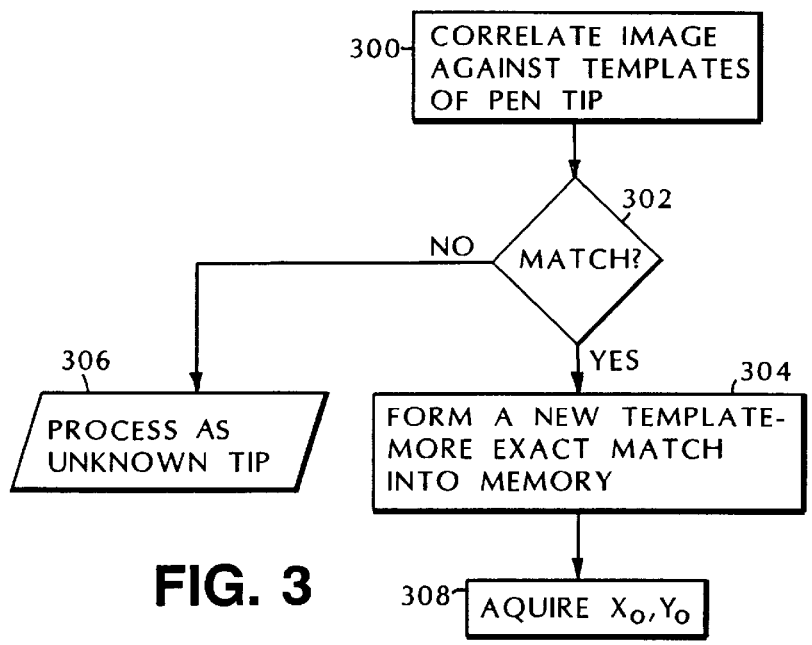
FIG. 3 shows the correlating operation of the present invention.

The known pen shape operation is described herein with reference to FIG. 3. Step 300 shows correlating the** image against all the templates of the pen tip. For the alternate embodiment, only a single pen tip is correlated. The entire area of the image is scanned to find a part of the image which matches the shape of the known pen tips. The number of known pen tips which can be stored is limited only by the amount of processing power. More templates being stored requires longer to obtain information about the image.

Step 302 determines if there is a match between any one of the pen tip templates and some area of the image. If there is, then that match is used to form a new template which more exactly matches the pen tip at step 304. If not, then flow passes to step 306 where the image is processed as having an unknown pen tip, and is processed according to the third scenario.

The third scenario presumes an unknown pen tip. This most general case allows the most system flexibility.

In order to determine an unknown pen tip, the inventors recognized that the environment around the pen will not change much during the sequence but the pen tip itself will move in position. The paper will not change very much but the hand and the pen being held will undergo a smooth movement between samples. The unknown pen tip is found by exploiting the fact that the pen and hand are the only moving things in the image. The area of the image that has the maximum motion is investigated to find the pen tip. The operation is shown in FIG. 4.

Figure 4:
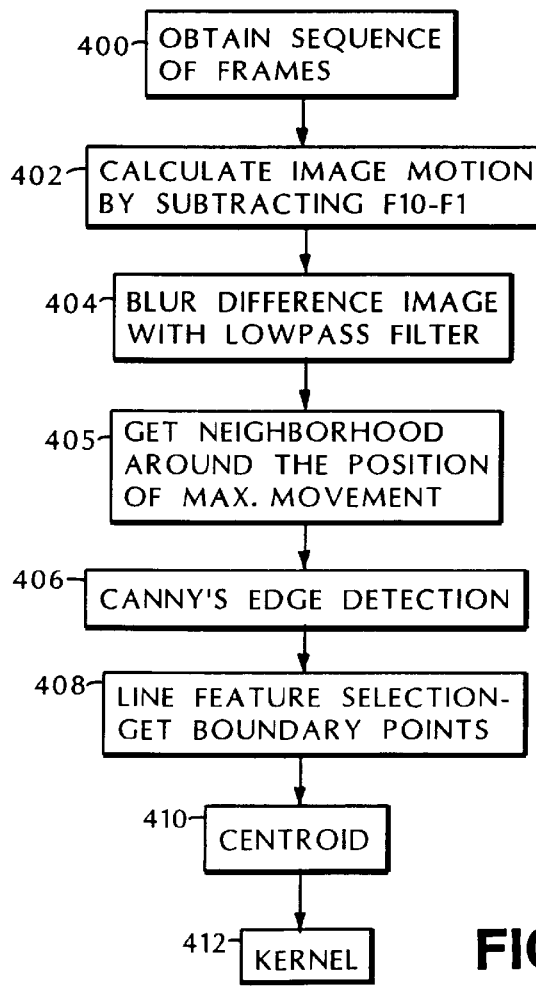
FIG. 4 shows the processing of an unknown pen tip according to the present invention.

FIG. 4 shows obtaining a sequence of frames at step 400 by obtaining a sequence of images of the writing instrument while writing. At step 402, a frame spaced from the first frame is subtracted from the first frame. The preferred embodiment preferably subtracts frame number 10 from frame number 1. At the preferred sampling rate of 60 hz, the two samples are therefore separated by 0.15 seconds.

At step 404, the difference image is blurred using a Gaussian or other low-pass filter. This filter eliminates many artifacts, to help obtain the maximum of the blurred subtraction. This maximum velocity within image frames occurs at the position of the hand and writing implement.

The best determination of pen tip position is obtained when there is a large contrast in brightness difference between the pen and its surroundings. This would be obtained for example with a white piece of paper and a black pen. Step 405 obtains a neighborhood of the first frame around this maximum velocity position which is processed in subsequent steps.

Step 406 obtains the estimate of the position of the writing implement tip in the neighborhood detected by step 405, using a Canny's edge detector as described in J. F. Canny, "A Computation Approach to Edge Detection", *IEEE Patt. Anal.*, Vol. 8, No. 6., pp. 679–698, (1986) over a neighborhood of the coarse estimate found with motion detection at step 404. Any other edge detector could alternately be used. At step 408, the system performs a line feature selection. Line feature selection is a well known technique of monitoring the sharpness difference between the pen tip and the paper. A line feature selection straightens the lines, and essentially removes the noise therefrom. In this way, the boundary points are formed into a sharper line.

The two steps of edge detection plus line feature selection, with an adequate threshold, provides the boundary of the pen tip, which we define as black or close to black, and the finger closet to the tip, which is white or close to white. Step 410 then computes a finer estimate of the position of the pen tip by obtaining the centroid of these boundary points. The centroid and boundary are used to select the kernel which will define the neighborhood of the image around the centroid at step 412. This neighborhood will include the image of the pen tip, the "kernel", that will be used to correlate with the subsequent images.

Tracker

Once the pen tip is acquired, one of the correlation techniques described herein are used to track that pen tip between the first frame and subsequent frames.

The subsequent images are investigated to find that same "kernel". A kernel is found by either a "maximum" correlation over the image, described below, or by a comparison which indicates that the kernel and some area of the image agree by 90–95%. Both comparisons are carried out pixel-by-pixel between the kernel and the image.

It is recognized herein that the correlation step is the most computationally intensive and hence the most time consuming step required for the tracking. The present invention further focuses on reducing the time spent in computing the information, while maintaining the accuracy. Two different correlation schemes are implemented, described herein as standard correlation and "gradient" correlation.

The preferred correlation technique according to the present invention carries out a summation of pixel products between the kernel and the image. The kernel k(x, y) is moved across the image, and compared with each of the image pixel set I(x,y). A summation product can be expressed as $$R(m, n) = \sum_{i=-\infty}^{+\infty} \sum_{j=-\infty}^{+\infty} I(m+i, n+j)k(i, j)$$

for m,n=x,y.

This corresponds to a product between each kernel-sized image neighborhood and the kernel itself. The largest value obtained by this correlation is the best match. Alternately, any point score greater than a certain value can be taken as a match.

Alternately, other "distance" measures can be used to determine whether the images agree by 90–95%. The best match is used as the detected position.

A preferred technique uses a pyramid filtering scheme to calculate correlation based on a filtered version of the image. The pyramid filtering scheme, as known in the art, uses a number of successive filtering operations to obtain a number of successively-filtered versions of the image. This technique is described in Burt & Adelson "The Laplacian Pyramid". The scheme is called pyramidal, since it forms a pyramid of successive images. The filtered image is coarser than the original image, so there are fewer pixels to compare.

The gradient correlation computes the gradient of the image and the gradient of the kernel. Both gradients are vectors. The components are correlated and the norm of the thus-obtained vector is calculated. The maximum correlation represents the best match.

All visual images, like all other real world signals, are corrupted by noise. The noise includes ambiguities due to shadows and other artifacts. The maximum noise immunity is obtained by correlating between the kernel and the whole image. However, searching the whole image is very computationally intensive.

A second, less-computationally intensive technique searches only a part of the image near the last position of the kernel. This is based on the inventor's realization that probably the pen cannot have moved far between two subsequent images. For example, when sampling at 60 Hz, we can assume that the pen will not have moved more than 50 pixels between subsequent image samples. The present invention teaches correlating over the past two frames to determine the part of the image near the previous position of the kernel which best matches the kernel.

Dynamic Filtering

The measurements of the position of the pen tip described above can be sped up by using a recursive estimation technique to predict the position of the pen tip shown schematically as element 114/processing block 225. This technique operates by predicting the most-likely position or positions of the pen tip, and then searching the neighborhood of that or those pen tips. The correlation between the "kernel" and the neighborhood of the predicted position of the centroid of the pen in the new frame is calculated. This reduces the necessary processing power, since the position of the pen in the new frame can be more accurately determined.

This can be effected by a Kalman filter 114, but more generally any dynamic filter or any linear predictor and smoother could be used with this recursive estimation technique.

All recursive estimation techniques are based on the knowledge that certain people write in certain ways. The knowledge of the user's writing is used to extrapolate the most-likely locations of the pen. Different models can be used including, for example, a cycloidal movement which describes the cursive technique, or linear model which describes block printing and line drawing. Establishing this model narrows the choices where to look for the kernel, and hence, can provide more efficient use of processing power to track the pen tip.

Figure 1A:
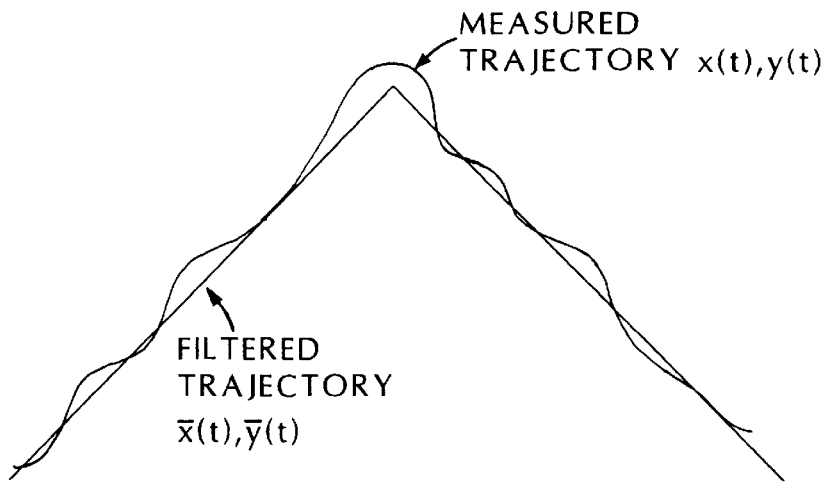
FIG. 1A shows a difference between an actual measured trajectory and a filtered trajectory.

The actual measured position from the tracker 112 is shown in FIG. 1 as x, y(t). This actual measured position is input to the linear predictor 114 to produce a filtered trajectory $\bar{x}$, $\bar{y}$. The difference between the filtered trajectory and measured trajectory is shown in FIG. 1A: the filtered trajectory essentially provides a more accurate recognition of the position of the pen tip. Linear predictor 114 also produces predictions xp, yp(t+1). The prediction is selectively input to the tracker depending on the position of switch 116. When switch 116 is closed, tracker 112 may operate using the predicted position.

The inventors have used the Kalman filter with two models. A cycloidal model, based on the work of Hollerbach, is a good model for cursive handwriting. The other model was an integrated random walk.

Three-Dimensional Tracking

Another aspect of the invention ignores and discards some of the information defined by the trajectory of the pen tip. The inventors realized that the entirety of the pen tip trajectories represent more information than is necessary to recognize the handwriting. This recognition is contrary to the established teaching in the art which states that more information helps to obtain better results. Here, the inventors recognized that less information actually gets better results. Some paring of the information helps to reduce the amount of information stored, and also helps for easier recognition. The trajectories show continuous movement of the pen tip, since only the frames where the pen is lifted and not writing are removed.

Another aspect of the invention therefore preferably detects the position of the pen in 3-dimensions. The x and y dimensions are used to obtain the writing implement desired movement information. When the pen is moved in the z direction, i.e. when the pen is lifted from the page, the movement is considered as writing implement undesired information. Operations are taken accordingly as described herein.

This alternate preferred embodiment does not store information corresponding to the position of the pen when the pen is lifted from the writing surface. An example of how this helps clarify the writing can be shown with reference with FIGS. 5A and 5B.

Figure 5A:
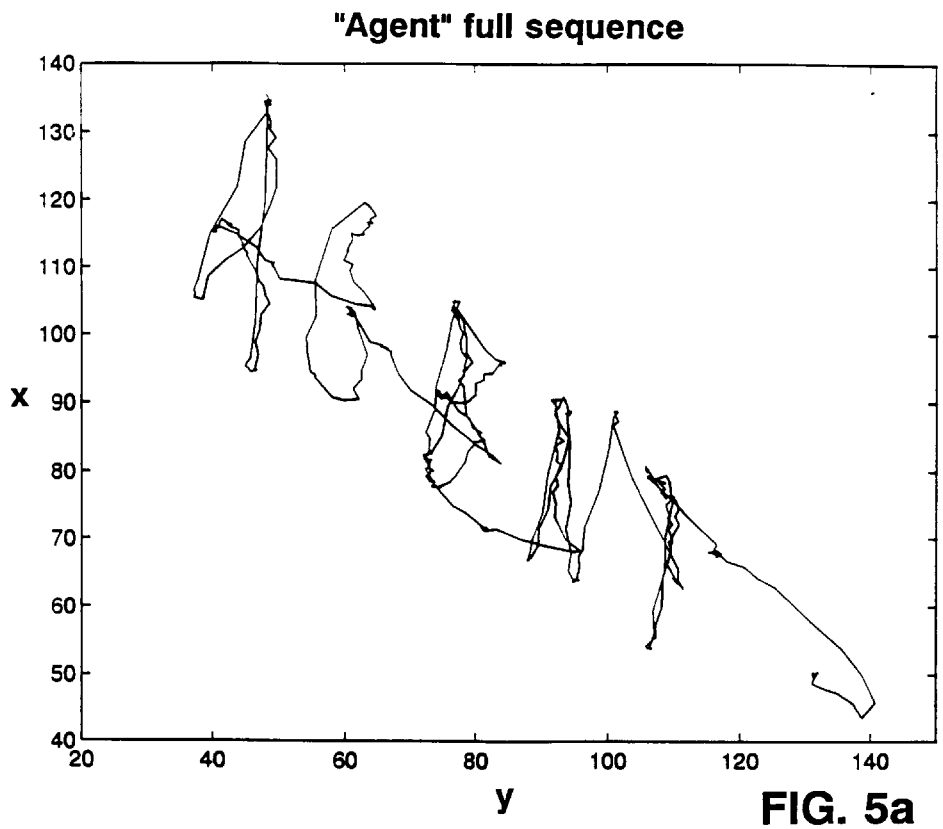
FIGS. 5A and 5B show examples of handwriting and how it changes when pen up/pen down is used.
Figure 5B:
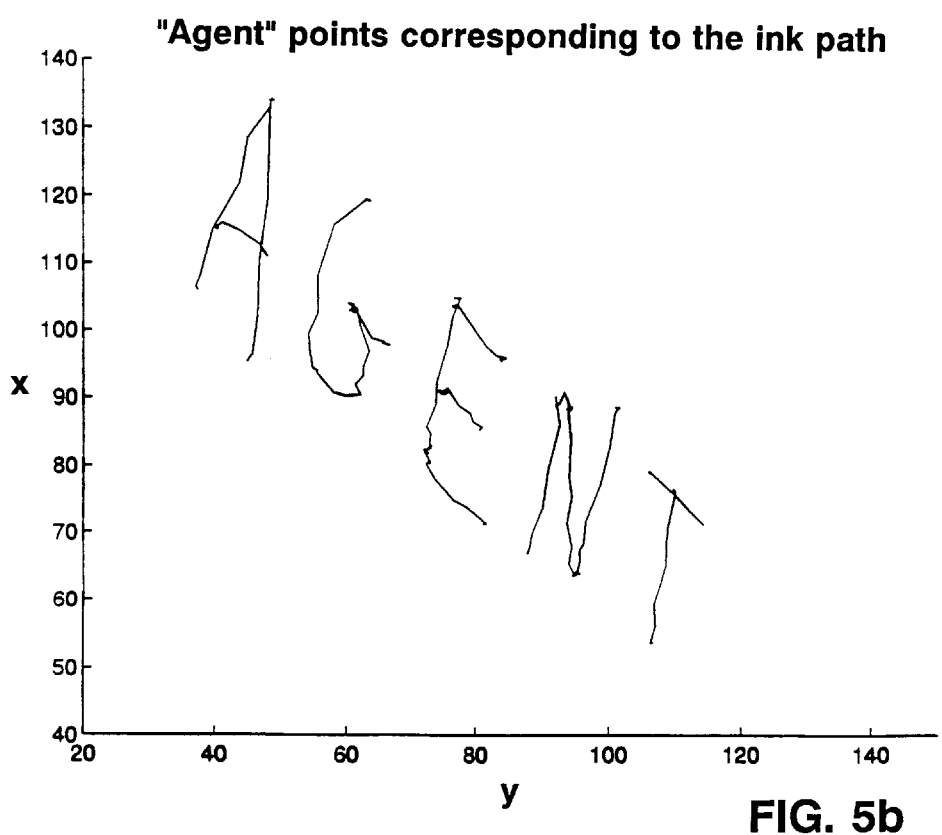

FIG. 5A shows the user writing the word "agent" when only a two dimensional rendering of the word is desired. This shows how the user ultimately lifts and lowers the pen, and many pen movements when the pen is removed from the paper are shown. FIG. 5B, in contrast, shows how the handwriting is clarified when only the pen down portion of the information is monitored.

According to a preferred aspect of the present invention, the path of the pen is only monitored when it is touching the page (pen down), not when the pen is up.

Any technique of determining z direction movement can be used according to the present invention. A presently preferred technique determines a z coordinate during writing (at initialization) and determines any coordinates spaced from that coordinate to be pen up. This can be carried out using two spaced video cameras to triangulate, or by other techniques.

The detection of the moments where the pen is lifted and not writing can also be accomplished by using the additional information given by the ink path on the paper.

The pen trajectory obtained with the tracker is segmented in small portions that contain at most 20 points. The preferred embodiment uses the points where the velocity of the writing is below a threshold to segment the trajectory.

The segments are classified as either "pen-up" or "pen-down" using standard pattern recognition techniques such as "nearest neighbors" or others (See Duda & Hart: "Pattern Classification and Scene Analysis" Wiley 1973) on a number of features like: pen velocity, curvature of pen trajectory, correspondence of pen trajectory with ink trace. The present embodiment employs a "nearest neighbor" method to categorize each segment.

The inventors realized that the obtained pen trajectory is displaced from the actual ink trace in the paper by a fixed amount since the centroid and not the pen tip is tracked. This trajectory needs to be shifted before doing the classification of the segments. The present invention finds the required shift by finding the best matches between the first three segments and the actual ink in the paper. The mentioned translation can be also obtained by asking the user to draw a circle or any known drawing in order to initialize the system.

Measurements

The preferred embodiment of the invention uses a Canon L1 video camera and recorder with an 8 mm video standard. This provides a spatial resolution of 480 by 640 pixels per frame. Color television system on the EIA standard, 525 lines by 60 fields is used and a ½-inch CCD 410,000 pixel image sensor.

The preferred mode of the present invention digitizes the pen movement into a sequence of frames. This sequence of frames must be sufficient to reconstruct the path of the pen tip in a way that will allow the handwriting to be recognized using a conventional handwriting recognition technique.

The inventors addressed the question of how the information given by the sequence of frames can be considered sufficient to reconstruct the path of the pen tip in a way that will allow the handwriting to be recognized. Their experiments showed that a sequence of frames at 60 Hz provides an accurate spatiotemporal representation of the trajectory described by the pen tip. We can consider the handwriting to be "encoded" within this trajectory. The following resolutions represent the preferred trade-off between accuracy, processing power, and system resources:

letter spacial sampling resolution 10×40;

pixels per letter in block letters and 10×20 pixels per letter in small letters.

letter temporal sampling resolution between 5 and 45 samples per letter.

The size of the pen tip is between 50×50 and 40×90 pixels.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A system for monitoring movement carried out by a writing implement on a writing surface using a visual input, comprising:

a camera of a type which monitors said writing implement relative to said writing surface, and produces an image signal indicative thereof;

a tracking element, which receives said image signal, recognizes a portion of the image which represents a portion of the writing implement in said image signal by comparing portions of said image signal to a writing implement image and processes said image signal to convert said image signal to a value indicative of position and/or movement of the writing implement relative to the writing surface; and an image processor, operating to convert said value indicative of position and/or movement into coordinates indicating a path of movement of said writing implement relative to said writing surface.

2. The system as in claim 1 wherein said camera monitors the visual input of a user writing on a piece of paper.

3. A system as in claim 1 wherein said camera monitors a visual input of a user writing on a writable board.

4. A system as in claim 1 wherein said image processor includes a handwriting recognition unit, and further comprising an output unit, coupled to said image processor, which displays handwriting-recognized information.

5. A system as in claim 1 wherein said tracking element processes said image signals by:

1) determining the portion that represents a tip of the writing implement in said image signal; and 2) following motion of said portion to determine a path defined thereby.

6. A system as in claim 5 wherein said tracking element determines a motion of a centroid of said tip, and wherein said tracking element also corrects for an offset between a centroid of the tip and an actual position of the tip.

7. A system as in claim 5 wherein said processing element detects the tip by accepting a manual input indicating the position of the tip.

8. A system as in claim 5 further comprising a template memory storing at least one image template indicating an image portion of a specific writing implement pen tip, and wherein said tracking element correlates said template with said image signal to determine a position of a tip matching said template within said image signal.

9. A system as in claim 8 wherein said template memory stores a plurality of said image templates, and said tracking element searches said image signal to determine any of said plurality of said image templates in said image signal.

10. A system as in claim 5 wherein said image element detects said tip by detecting an area in the image signal which has maximum motion.

11. A system as in claim 5 wherein said tracking element follows motion by correlating a kernel image of the tip to positions of matching features in said image signal.

12. A system as in claim 11 wherein said tracking element carries out said correlating by determining a kernel indicative of a shape of said tip;

multiplying said kernel by a plurality of portions of the image signal; and taking a maximum of said multiplications by said portions as being a correct position.

13. A system as in claim 11 wherein said correlating monitors positions in the image signal which are within a predetermined distance of a last position in the image signal.

14. A system as in claim 11 wherein said tracking element also carries out a prediction operation to predict a most likely position of the tip, said correlating carried out in said most likely position of the tip.

15. A system as in claim 11, further comprising a pyramid filter which filters said image signal to produce a reduced-resolution image signal; wherein said correlating is carried out between said reduced-resolution image signal and said kernel.

16. A system as in claim 1, further comprising a memory for storing frames of information from said camera, said frames obtained at spaced time increments.

17. A system as in claim 16, wherein said tracking element determines a first condition of said writing implement relative to said writing surface, and does not store information in said memory while said first condition is determined to exist.

18. A system as in claim 17, wherein said first condition is said writing implement being spaced from said writing surface.

19. A writing processing system, comprising:

a first device which obtains video images of a part of a writing implement relative to a writing surface;

a processor, receiving said video images from said first device, and processing said video images to determine a position of the writing implement therein over multiple frames defined by said video images, to produce a tracking signal indicative of position and/or movement of the writing implement over said multiple frames, said processor recognizing different kinds of writing implements by storing a plurality of different template images, said different template images including different shapes of writing implement tips therein, determining a template image indicating a tip of a writing implement within a frame of the video image, and tracking a position of said template image within said frame, and said tracking signal indicating position and/or movement of said any of said different kinds of writing implements including a writing implement which is dark relative to its background; and an output unit, which produces an output signal indicative of said tracking signal.

20. The system as in claim 19 wherein said first device monitors the visual input of a user writing on a piece of paper.

21. A system as in claim 19 wherein said first device monitors a visual input of a user writing on a writable board.

22. A system as in claim 19 wherein said output unit includes a handwriting recognizer, which recognizes handwriting based on said tracking signal and which displays recognized information.

23. A system as in claim 19 wherein said processor processes said video image by:
   1) determining an image of a tip of the writing implement in said video images; and
   2) following motion of said tip to determine a path defined thereby.

24. A system as in claim 23 wherein said processor follows a motion of a centroid near the tip, and wherein said processing element also corrects for an offset between a centroid of the tip and an actual position of the tip.

25. A system as in claim 23 wherein said processor detects the tip by accepting a manual input indicating the position of the tip.

26. A system as in claim 23 further comprising a template memory storing at least one image template indicating a image portion of a specific writing implement tip, and wherein said processing element correlates said template with said video image to determine a position of a tip matching said template within said video images.

27. A system as in claim 26 wherein said template memory stores a plurality of said templates, and said processing element searches said video images to determine any of said plurality of said templates in said video images.

28. A system as in claim 23 wherein said processing element detects said tip by detecting an area in the video images which has maximum motion.

29. A system as in claim 23 wherein said processing element follows motion by correlating a kernel image of the tip to positions of matching features in the video image.

30. A system as in claim 29 wherein said processing element carries out said correlation by determining a kernel indicative of a shape of said pen tip,
   multiplying said kernel by a plurality of portions in the video image; and
   taking a maximum of said multiplications by said portion as being a correct position.

31. A system as in claim 29 wherein said correlating monitors positions in the video image which are within a predetermined distance of a last position in the video image.

32. A system as in claim 29 wherein said processor also carries out a prediction operation to predict a most likely position of the tip, said correlation carried out in said most likely position of the tip.

33. A system as in claim 19 wherein said processor operates by determining an area of the video image which has maximum motion, determining a centroid of said area of the image which has the maximum motion, and determining a distance between a position of a tip of the writing implement and the centroid.

34. A system as in claim 33 wherein said maximum motion is obtained by using a low pass filter to blur the image and find the maximum motion position.

35. A system as in claim 26 wherein said processing element finds an area of maximum motion of the image if no portion of the image matches a template.

36. A system as in claim 19 wherein said processing element determines whether the writing implement is touching the writing surface, and said output indicative of movement of the writing implement is produced only when said writing implement is touching the writing surface.

37. A system as in claim 36 further comprising a second camera, located in a different position spaced from the image, to triangulate x, y and z positions; said x and y positions used for outputting positions of movement, and said z position used for determining whether the writing implement is touching the surface.

38. A system as in claim 32 wherein said prediction is carried out using a Kalman filter.

39. A system as in claim 19, wherein said processing element determines a first condition of said writing implement relative to said writing surface, and does not store information in said memory while said first condition is determined.

40. A method as in claim 39, wherein said desired point in said video image is a position of a tip of the writing implement, and said center point is a centroid of the kernel.

41. A method as in claim 40, wherein said tracing comprises obtaining a video image of a writing implement relative to a writing surface at a first time;
   determining a portion of said image representing a kernel to be tracked in position;
   obtaining a position of said kernel in said video image at said first time;
   obtaining a video image of the writing implement relative to the writing surface at a second time;
   obtaining a position of said kernel in said video image at said second time;
   determining a distance between a desired point in said video image to be tracked, and a center point of said kernel; and
   correcting said positions using said distance, and determining a path between said first and second positions.

42. A method of monitoring the movement of a writing implement on a writing surface, comprising:
   obtaining a video image of a writing implement relative to a writing surface at a first time;
   determining a portion of said image representing a kernel to be tracked in position;
   obtaining a position of said kernel in said video image at said first time;
   obtaining a video image of the writing implement relative to the writing surface at a second time;
   obtaining a position of said kernel in said video image at said second time;
   determining a distance between a desired point in said video image to be tracked, and a center point of said kernel;
   correcting said positions using said distance, and determining a path between said first and second positions;
   monitoring whether the writing implement is in contact with the writing surface, and wherein said determining comprises determining that said information is undesired when the writing implement is out of contact with the writing surface.

\* \* \* \* \*